United States Patent [19]

Logie et al.

[11] 4,270,147

[45] May 26, 1981

[54] APPARATUS FOR LIMITING FACSIMILE TRANSMISSION DURATIONS

[75] Inventors: James A. Logie, Orlando; T. James Bryan, Altamonte Springs; Arthur G. Wilson, Maitland, all of Fla.

[73] Assignee: Exxon Research & Engineering Company, Florham Park, N.J.

[21] Appl. No.: 120,490

[22] Filed: Feb. 11, 1980

[51] Int. Cl.³ .................................................. H04N 1/38
[52] U.S. Cl. ................................... 358/256; 358/257; 358/280
[58] Field of Search ................. 358/257, 256, 280, 282

[56] References Cited

U.S. PATENT DOCUMENTS

| | | | |
|---|---|---|---|
| 2,953,639 | 9/1960 | Koll | 358/282 |
| 3,952,144 | 4/1976 | Kolker | 358/282 |
| 4,001,500 | 1/1977 | Lavery | 358/282 |

*Primary Examiner*—Howard W. Britton
*Attorney, Agent, or Firm*—Norman L. Norris

[57] ABSTRACT

The scanning drum of a facsimile receiver carries a longitudinally extending stripe such that portions of the stripe at opposite extremities of a document carried by the drum are exposed. The width of the stripe at the exposed portion adjacent the leading edge of the document is sensed by an optical sensing head and stored in memory prior to transmitting dark/light variations in the document. The scanning of the document continues until the optical scanning head is juxtaposed to the exposed portion of the drum adjacent the trailing edge of the document. At this time, the width of the stripe is again detected and compared with the width in memory so as to verify that the scanning of the document is complete. The facsimile transmission is then terminated.

10 Claims, 4 Drawing Figures

APPARATUS FOR LIMITING FACSIMILE TRANSMISSION DURATIONS

BACKGROUND OF THE INVENTION

This invention relates to facsimile transmitters and receivers of the type utilized to transmit and receive information-bearing signals representing the dark/light variations on a document located at the transmitter and converting the information-bearing signals to marks or images on a copy medium located at the receiver so as to form a copy which is a reasonable facsimile of the original document.

Most facsimile transmitters will accommodate documents of various sizes, e.g., various lengths. In facsimile transmitters employing a scanning drum, one edge of the document is typically clamped on the drum, and the drum is rotated while a scanning head moves parallel to the drum in a generally longitudinal direction parallel with the axis of the drum. In such an arrangement, the overall length of the document may vary. However, unless the transmission is somehow interrupted, the transmission will continue until the scanning head has traversed a full length of the drum despite the fact that the document may occupy less than half of the length of the drum. This of course extends the transmission time unnecessarily while the scanning head is scanning the surface of the drum.

It is, of course, possible to terminate the facsimile transmission by merely having the operator stop the transmission once the full length of the document has been scanned. However, operator control cannot, of course, be relied upon in an unattended mode of operation. Moreover, timely operator termination requires that the operator be vigilant during the transmission. Furthermore, termination is subject to operator error which may produce an untimely or early termination of the facsimile transmission resulting in less than all of the information on a document be transmitted. On the other hand, operator termination may be somewhat delayed thereby adding some unnecessary amount of time to the length of the facsimile transmission.

Heretofore, it has been suggested that the duration of a facsimile transmission can be controlled by marking along the margin of a document to be transmitted with a continuous line. The facsimile transmitter then continues to scan the document as long as the line is detected. When the line is no longer detected, the facsimile transmission is terminated. This technique for shortening facsimile transmissions so as to correspond with the length of the document is undesirable in a number of respects. First, the technique requires operator intervention and is therefore subject to operator error. Second, it requires that the document be defaced. Third, the facsimile transmitter must be capable of responding to the line to continue transmission even though the characteristics of that line will vary widely as a function of operator, marking member and the presence of another line on the document. Of course, if the transmitter fails to recognize the line when operating in this particular mode, the transmission may be terminated in an untimely manner.

SUMMARY OF THE INVENTION

It is an object of this invention to automatically control the duration of the facsimile transmission as a function of document dimension.

It is a more specific object of this invention to achieve the foregoing without substantial operator intervention.

It is a further object of this invention to achieve the foregoing with substantial reliability.

It is a still further object of this invention to achieve the foregoing without defacing the document.

In accordance with these and other objects of the invention, a facsimile apparatus comprises document support means, sensor means in communication with the document support means and a document carried by the support means and facsimile transmission means coupled to the sensor means for generating transmission signals representing dark/light variations on the document.

In accordance with this invention, the document support means includes a dark/light pattern which is detectable by sensor means. The sensor means is capable of recognizing a pattern after the transmission of dark/light variations on the document which indicates that the sensor means is no longer juxtaposed to the document but rather to an exposed portion of the document support means.

In accordance with another important aspect of the invention, the pattern is also detected prior to transmitting the signals representing dark/light variations on the document. The pattern is then stored in memory for comparison with the subsequently detected pattern. Once the pattern has been detected, the relative scanning motion between the head and the document support means may be accelerated.

In the preferred embodiment of the invention, the document support means comprises a rotatable drum and the sensor means scans the drum in a direction generally parallel with the axis of the drum. The pattern may comprise a stripe carried on the surface of the drum.

DETAILED DESCRIPTION OF A PREFERRED EMBODIMENT

Figure 1:
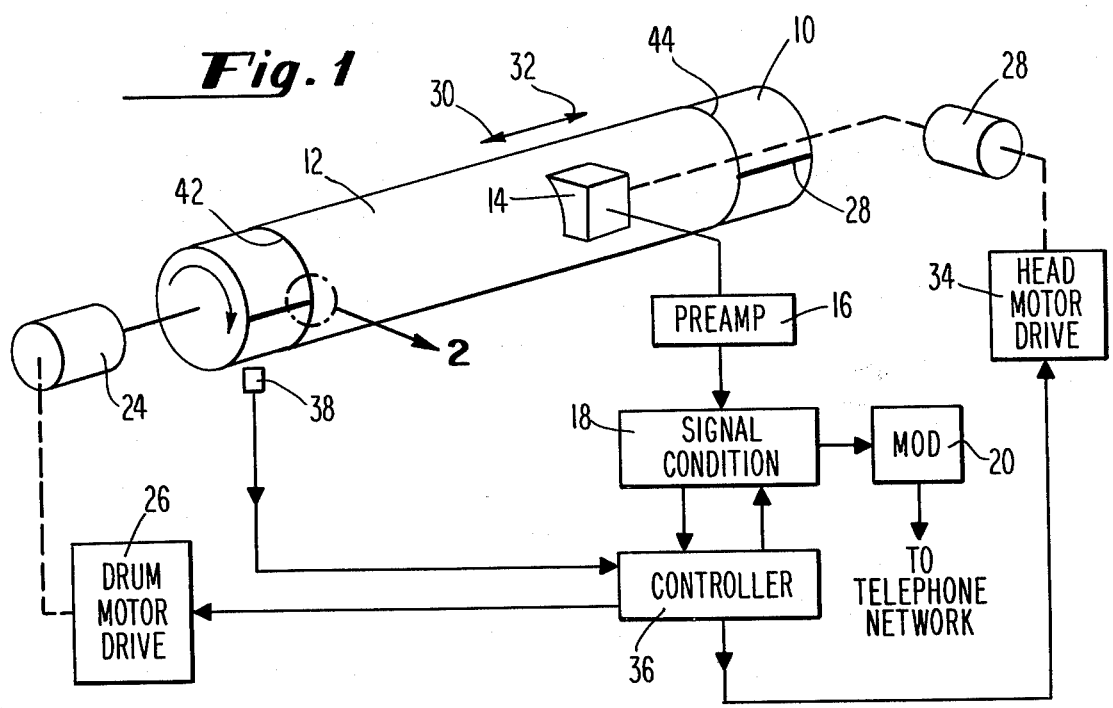
FIG. 1 shows a facsimile transmitter.

Referring to FIG. 1, a facsimile transmitter is shown. The transmitter comprises a drum 10 which serves as a support means for a document 12. A scanning head 14 including optical sensor means not shown is juxtaposed to the drum 10 and the document 12. The output signal from the sensor means which represents dark/light variations in the document 12 as well as the drum 10 is applied to a preamplifier 16 and a signal conditioning network 18. The output from the signal conditioning network 18 is applied to a modulator 20 for generating transmission signals to be applied to a communication or telephone network.

In order to achieve the desired scanning of the document 12 by the sensor means carried on the head 14, the drum 10 is rotated in a direction indicated by an arrow 22 by means of a motor 24. A drum motor drive circuit 26 is coupled to the motor 24. In addition, a head motor 28 is provided which moves the head 14 along the drum in both of the directions indicated by arrows 30 and 32. A head motor drive circuit 34 is connected to the head motor 28.

A controller 36 is also shown in FIG. 1. The controller 36 controls the motor drive circuits 26 and 34. In addition, the controller 36 is responsive to the output from the signal conditioning network 18 as well as a limit switch 38 which is contacted by the head 14 and the head 14 is advanced in the direction 30 to the extremity of the drum 10. Alternative means for the controller 36 will be described in greater detail with reference to FIGS. 3 and 4.

Figure 2:
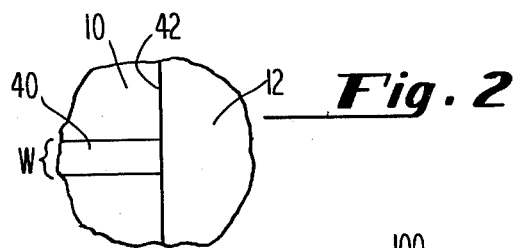
FIG. 2 shows a detail of drum indicia.

In accordance with this invention, the document support means, more particularly the drum 10, carries a dark/light pattern. As shown in FIGS. 1 and 2, this pattern comprises an elongated stripe 40 extending the length of the drum 10 and generally parallel with the axis thereof. Because the stripe 40 does extend the length of the drum, a portion of the stripe 40 is exposed at the leading edge 42 as well as the trailing edge 44 of the document 12. As shown in FIG. 2, the stripe 40 has a width W which is distinctive so as to be recognizable by the controller 36. As will be be shortly described with reference to FIG. 3, the width W of the stripe 40 is initially stored in memory when the head 14 is in communication with the stripe 40 adjacent the leading edge of the document 42. The width W of the stripe in memory is then compared with the width detected when the head 14 is juxtaposed to the stripe 40 adjacent the trailing edge 44 so as to minimize the risk that dark/light information carried on the document 12 will give an early or untimely indication that the full length of the document 12 has been scanned. In accordance with this invention, the scanning head 14 continues in the direction indicated by the arrow 32 until such time as the stripe 40 is detected adjacent to trailing edge 44. Such detection will terminate the transmission so as to minimize the amount of telephone network time utilized.

Figure 3:
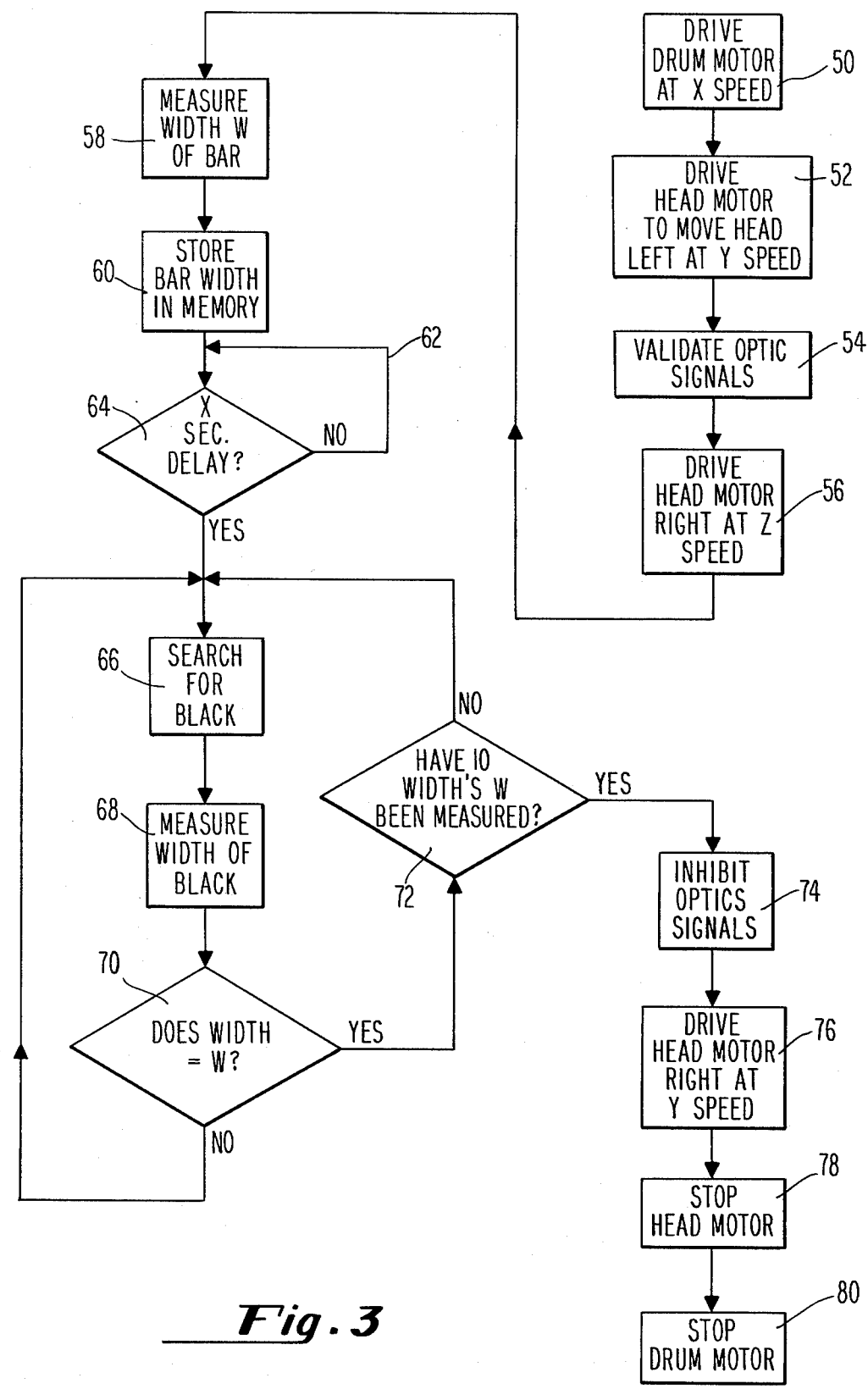
FIG. 3 shows a flowchart for control.

Reference will now be made to FIG. 3 for a more detailed description of the operation of the apparatus as shown in FIG. 1 wherein the controller 36 comprises a microprocessor.

Referring to FIG. 3, driving of the drum motor 24 is initiated at X speed as shown at block 50. Driving of the head motor 28 is also initiated shown at block 52 such that the head 14 advances rapidly in the direction 30 at Y speed. When the head 14 reaches the limit switch 38 shown in FIG. 1, the optic signals applied to the microprocessor 36 are validated to ensure that the stripe is detected as shown in block 54. At this time, the head motor 28 reverses its direction and drives so as to move the head in the direction depicted by the arrow 32 at a speed Z as shown in block 56.

During this motion of the head 14 in the direction 32 at Z speed, the width W of the bar 40 is measured as shown in block 58. This width W is stored in memory as shown at block 60. A time delay of X seconds after the width W is stored assures that the head 14 is juxtaposed to the document 12 after the head 14 is juxtaposed to the document 12, a search for black is initiated as shown at block 66. If the search was initiated earlier, the sensing of the stripe 40 adjacent the leading edge 42 could prematurely terminate transmission.

It will, of course, be appreciated that this search is conducted simultaneously with the transmission of information-bearing signals generated at the modulator 20. Each time black is identified, the width of the black is sensed as shown at block 68. If the width of the black does not equal W, as indicated at block 70, the search continues. When the width of the black does equal W, the search will continue until ten widths W have been measured consecutively as indicated at block 72. Once ten widths W have been measured, then it may be assumed that the head 14 must be over the stripe 40 width. At this time, the optic signals may be inhibited as shown at block 74 and the head motor may be advanced rapidly at Y speed in the direction 32 to the end of travel as shown at block 76. When the head 14 reaches the end of travel, the head motor is stopped and the drum motor is stopped as shown at blocks 78 and 80.

From the foregoing comments, it will be appreciated that the facsimile transmission may be terminated as soon as the scanning head 14 has completed its travel across the document 12. Therefore, if the document 12 is relatively as short as measured along the axis of the drum, the transmission will be short.

The actual termination of the transmission may be accomplished in a variety of ways. It may, for example, be accomplished by transmission of an end of message signal (EOM) in accordance with CCITT protocol. It may also be accomplished without any signaling by the modulator 20 beyond termination of the transmission which would be sensed by a remote receiver.

Figure 4:
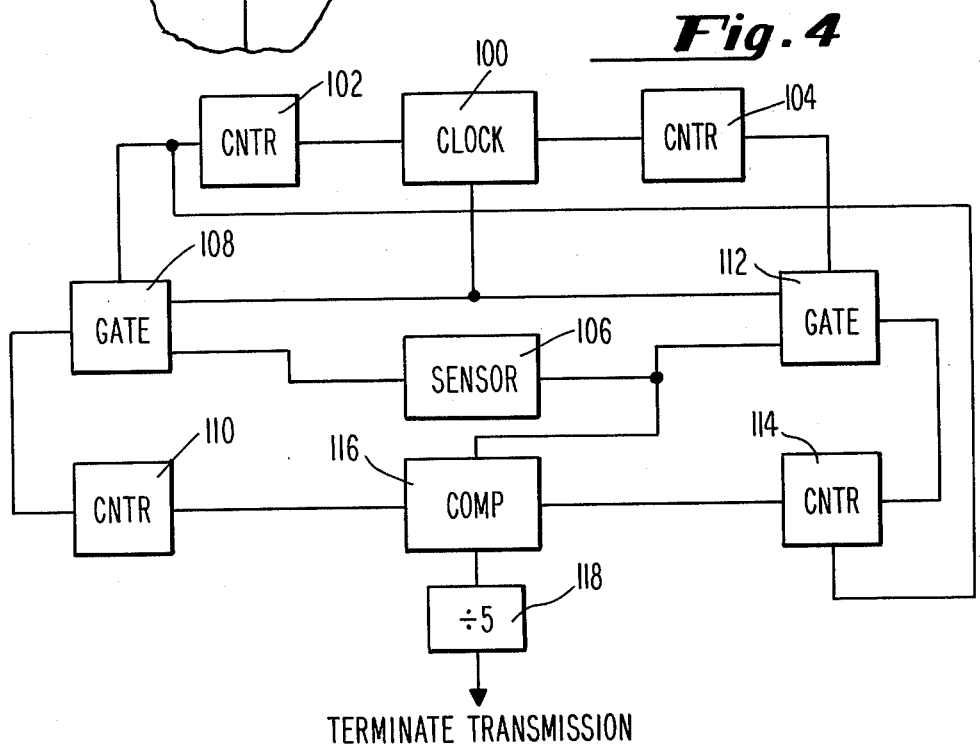
FIG. 4 shows a controller for facsimile transmission.

Reference will now be made to FIG. 4 for a discussion of a controller 36 which utilizes discrete logic circuitry to perform most of the various control functions described in FIG. 2. As shown in FIG. 4, the controller 37 comprises a clock 100 which generates a series of pulses which preferably corresponds to tachometer pulses of the drum motor 24. The output from the clock 100 supplies a first counter 102 and a second counter 104. The first counter 102 is adapted to recycle every revolution of the drum 10, i.e., the counter 102 resets to 0 after a full revolution of the drum 10. The second counter 104 is adapted to reach a full count, i.e., produce an output, after a sufficient number of revolutions of the drum 10 so as to assure that the head 14 is over the document 12.

A sensor 106 carried by the head 14 as shown in FIG. 1 enables a gate 108 so as to pass clock pulses from the clock pulse source 100 whenever black is detected by the sensor 106 as in the case of the stripe 40. Pulses which pass the gate 108 are applied to another counter 110 which stores a count representing the width of the stripe 40. After one complete revolution of the drum as represented by the output of the counter 102, the gate 108 is inhibited and the count in the counter 110 representing width W of the stripe 40 is stored in the counter 110.

Another gate 112 is coupled to the sensor 106 and the counter 104. The gate 112 is only enabled after a full count is accumulated in the counter 104 so as to assure juxtaposition of the head 14 and the document 12 on the drum 10. Once the gate 112 is enabled, pulses pass through the gate 112 to a counter 114 as long as the sensor 106 detects black. As long as the head 14 is juxtaposed to the document 12, counter 114 will accumulate a count during each revolution of the drum 10. When count at the end of revolution of the drum 10 coincides with the count accumulated in the counter 110 as determined by a comparator 116, an output pulse is supplied to a divider 118 so as to indicate that black area has been detected which is of the same width as the width W of the stripe 40 as stored in the counter 110. At this time, the counter 114 is reset by the output of the counter 102, and the sensor 106 again looks for black. When counter 114 reaches the same count at the end of each revolution of the drum 10, one pulse per revolution is supplied to the divider 118. When five such pulses have been applied to the divider 118, it is assumed that the sensor 106 carried by the head 14 is detecting the width of the stripe 40 adjacent the trailing edge 44 of the document 12 and an appropriate termination of transmission signal is generated.

In order to assure that the comparator 116 will only produce an output at the end of an accumulating count in the counter 114 and not during such a count, a sensor 106 is coupled to the comparator 116 so as to inhibit the comparator 116 as long as the sensor 106 is detecting black. Without such inhibiting, the comparator 116 could produce an output once the count in the counter 114 is, for example, half way through a black area twice as wide as the stripe 40 and this would of course produce an erroneous indication that the stripe 40 had been detected.

In the embodiment of FIG. 4, the total black during a revolution of the drum 10 is detected. In other words, the comparator 116 could produce an output pulse after detecting a total amount of black equal to width W of the stripe 40 even though that total amount of black was continuous and even though the amount of black was detected in widely separated revolutions of the drum. In contrast, the embodiment of FIG. 3 measures the width of the continuous areas of black. It is therefore less likely to be deceived by markings on the document 12.

From the foregoing, it will be appreciated that the signal conditioning circuit 18 is extensively relied upon in distinguishing the stripe 40 on the drum 10. In this connection, it may be desirable to employ signal conditioning network disclosed in copending application Ser. No. 120,340 filed Feb. 11, 1980 which is also incorporated herein by reference.

In the preferred embodiment, document support means has comprised a drum 10. It should, of course, be appreciated that the support for the document 12 may comprise a flat bed, and the flat bed scanning techniques may be utilized for other than the rotatable drum technique disclosed herein. In such an arrangement, the stripe would extend from the top to the bottom of the flat bed on which the document 12 is supported. Of course, other scanning arrangements may be utilized having document support means of various configurations. It will also be appreciated that the stripe 40 need not be utilized. Rather, any recognizable pattern may be employed.

Although the details of the modulator 20 have not been disclosed, it will be appreciated that various modulation techniques may be utilized. Commonly utilized facsimile modulation techniques include frequency modulation as well as a combination amplitude modulation and digital FSK (frequency shift keying) specified by CCITT.

Although a preferred embodiment of the invention has been shown and described and various modifications and alternatives suggested, other embodiments, modifications and alternatives will occur to those of ordinary skill in the art which fall within the true spirit and scope of the invention as set forth in the appended claims.

What is claimed is:

1. A method of controlling the duration of a facsimile transmission in response to the dimension of a document being transmitted from a facsimile apparatus including document support means having a predetermined dark/light surface pattern, sensor means in communication with said surface pattern and/or said document, means for scanning said sensor means relative to said support means and facsimile transmission means coupled to said sensor means for generating transmission signals representing dark/light variations on said document, said method comprising the following steps:

placing a document on said scanning means so as to expose at least a portion of said patterns;

scanning said sensor means relative to said support means;

transmitting facsimile signals representing dark/light variations on said document when said sensor means is in communication with said document;

detecting said pattern when said sensor means is in communication with said surface pattern; and terminating said transmitting in response to said detecting.

2. The method of claim 1 further comprising the step of accelerating said scanning in response to said detecting.

3. The method of claim 2 wherein accelerating occurs during terminating.

4. The method of claim 1 further comprising the steps of detecting said pattern prior to transmitting and storing said pattern in memory.

5. The method of claim 4 further comprising the step of comparing said stored pattern with the detected pattern and thereafter terminating or transmitting in response to the comparing.

6. The method of claim 4 wherein said step of comparing is repeated a predetermined number of times prior to terminating.

7. Facsimile transmitting apparatus comprising:

document support means for supporting a document to be transmitted;

sensor means in communication with said document and an exposed portion of said document support means not covered by said document;

means for scanning said sensor means relative to said document support means; and facsimile transmission means coupled to said sensor means for generating transmission signals representing dark/light variations on a document;

the improvement comprising:

a dark/light pattern carried by said support means; and means for recognizing said pattern and terminating a transmission in response to said recognizing.

8. The facsimile apparatus of claim 7 wherein said pattern comprises a stripe.

9. The facsimile apparatus of claim 8 wherein said support means comprises a drum and said stripe extends substantially longitudinally along said drum.

10. The facsimile apparatus of claim 7 wherein said means for recognizing comprises:

means for initially storing said pattern while one exposed portion of said support means adjacent one end of said document is juxtaposed to said sensor means; and means for subsequently comparing the stored pattern with another sensed portion while said other exposed portion of said support means adjacent another end of said document is juxtaposed to said sensor means.

* * * * *